Patented May 17, 1932

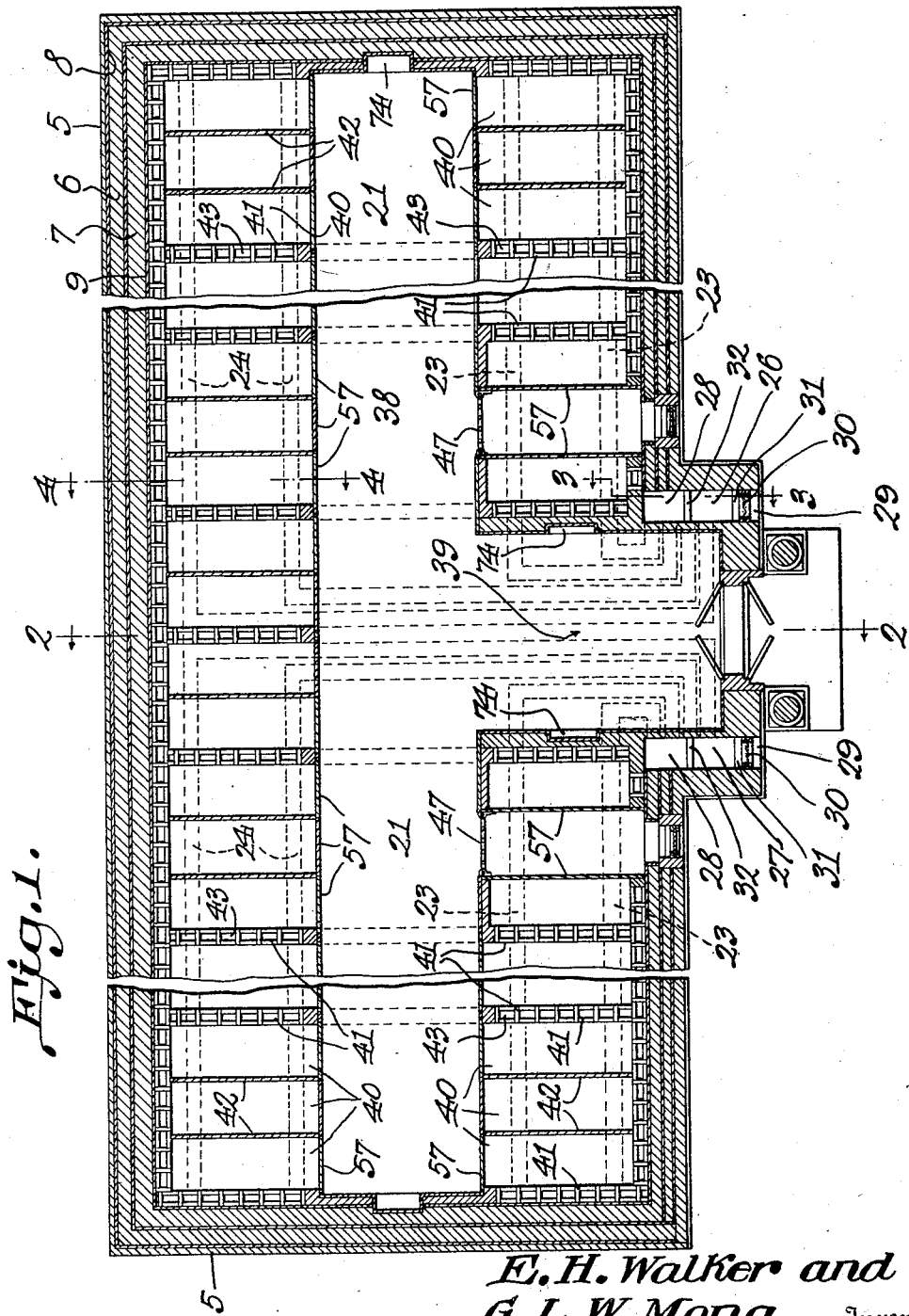

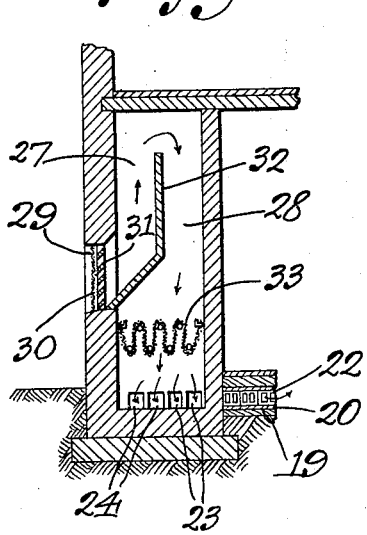
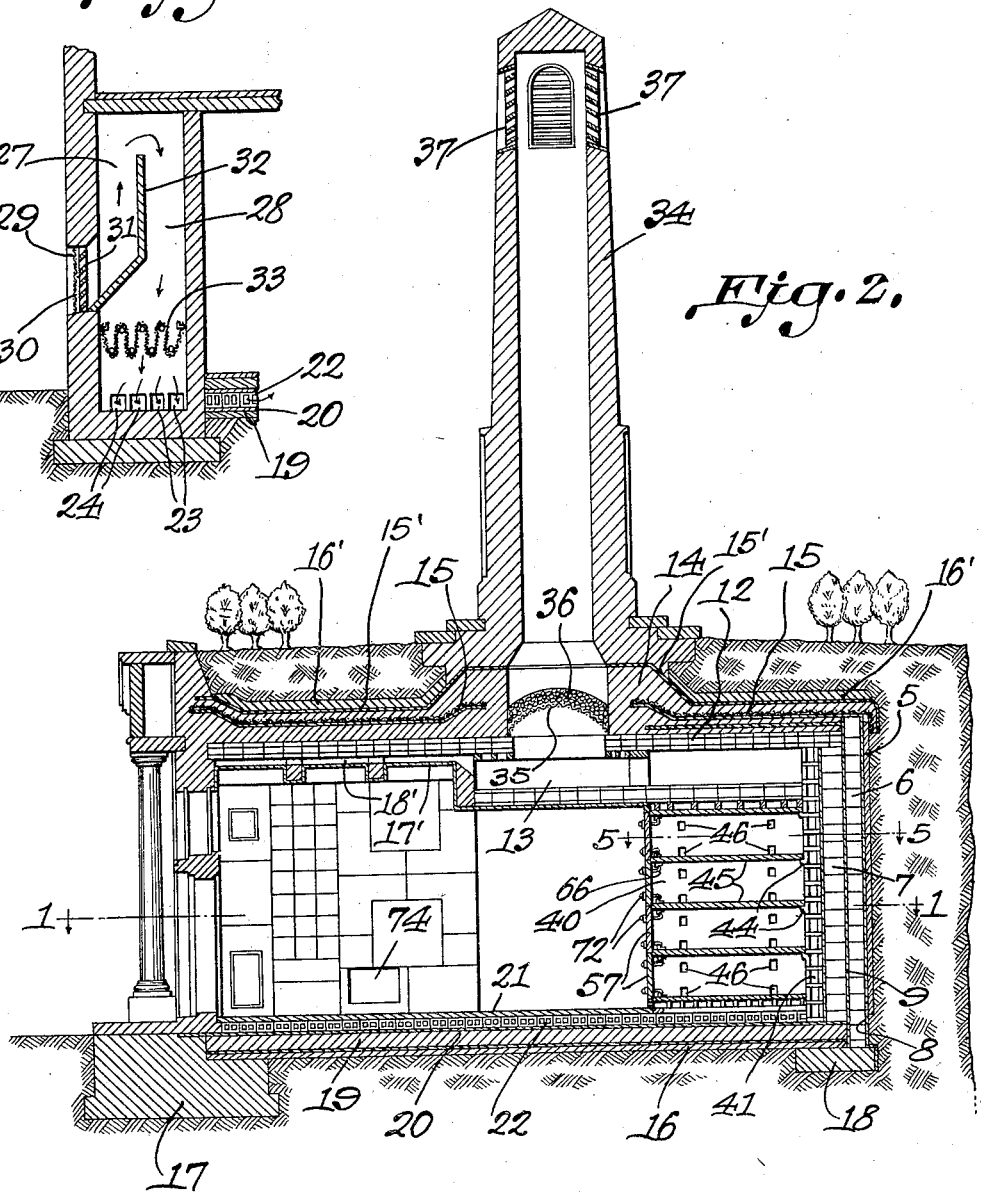

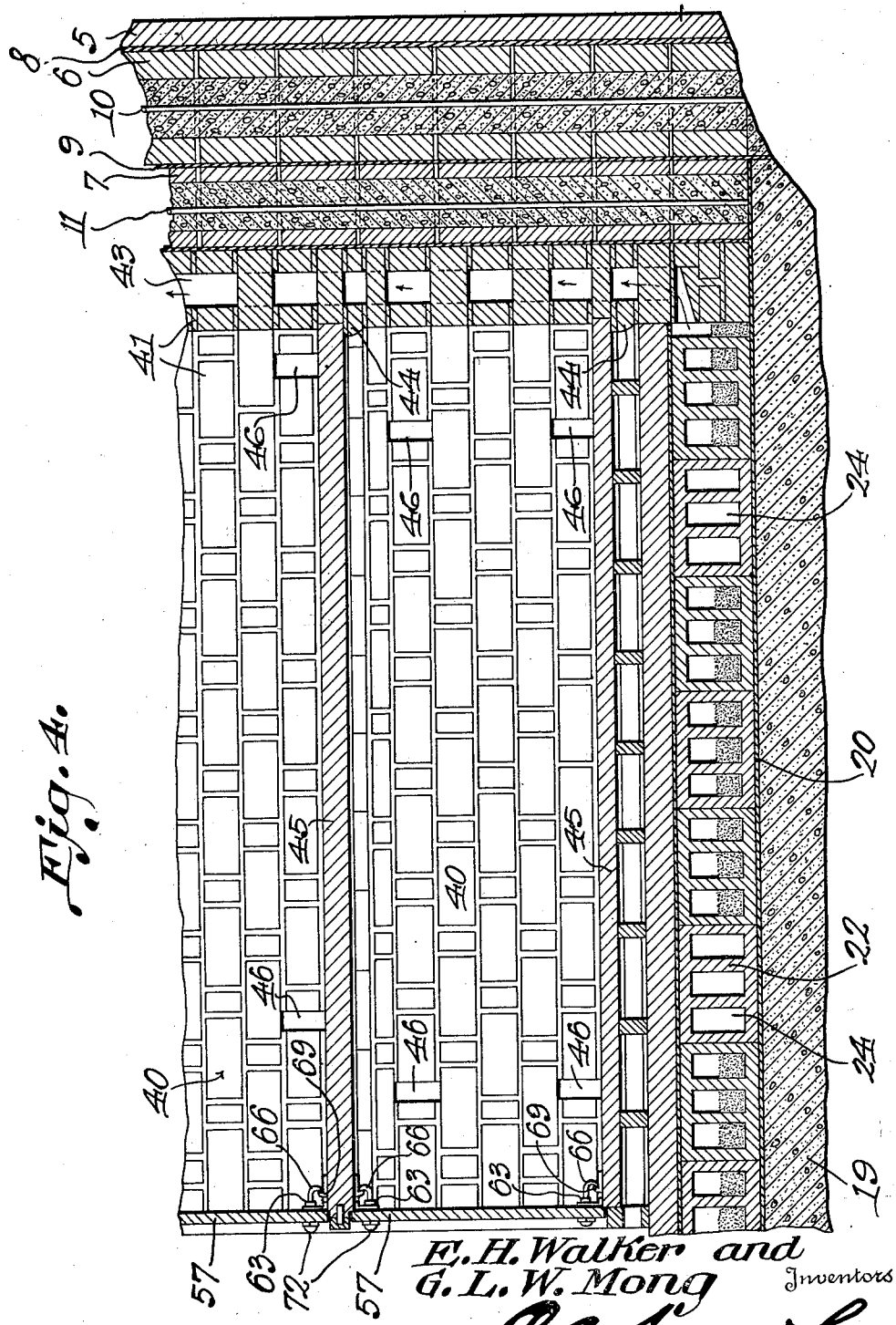

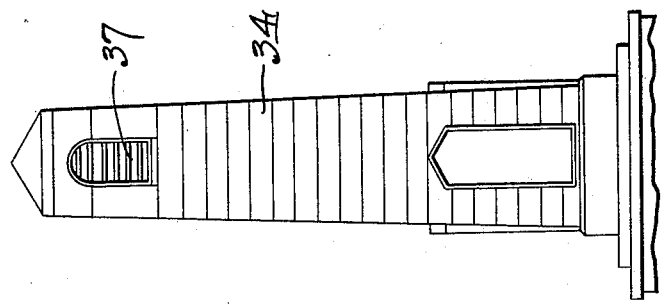
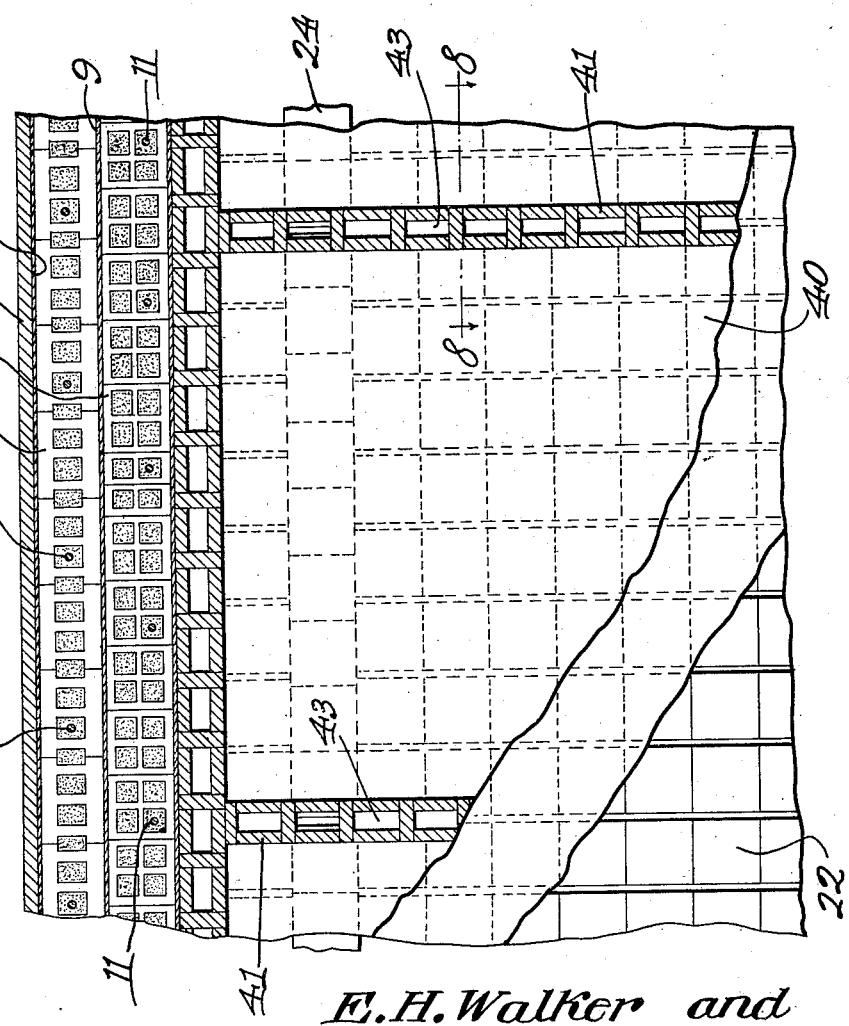

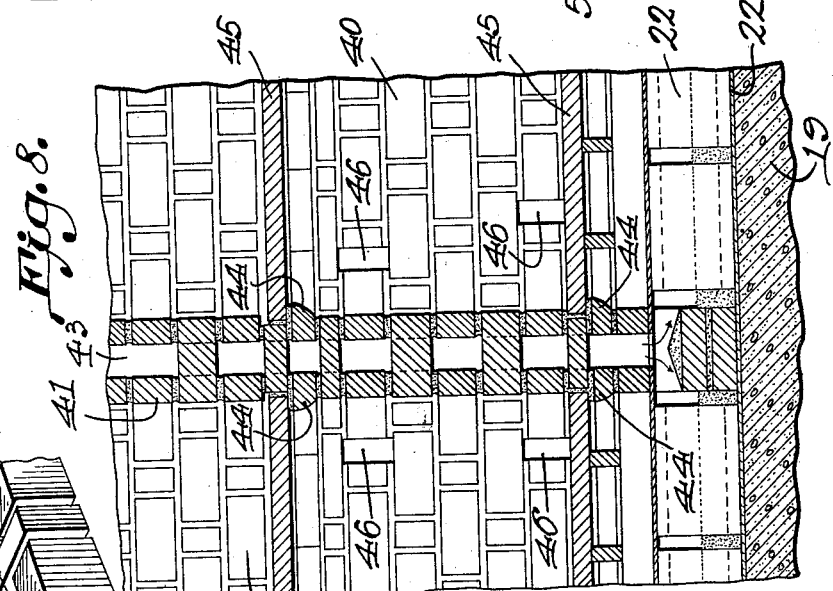
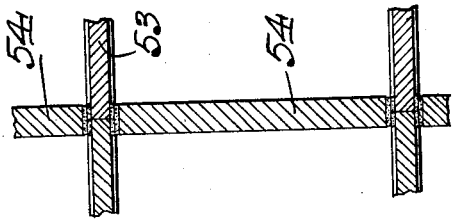
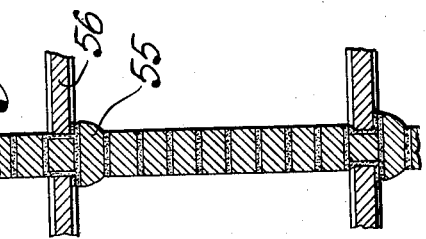
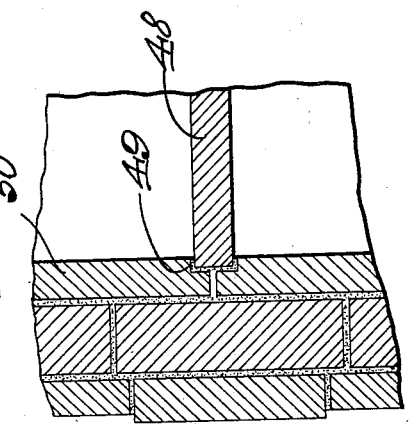
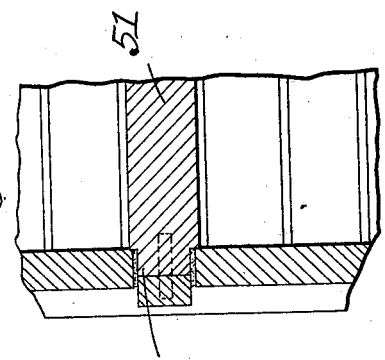
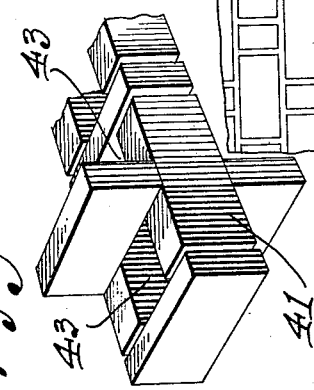
E. H. Walker and
G. L. W. Mong  Inventors
By C. A. Snow & Co.
Attorneys.

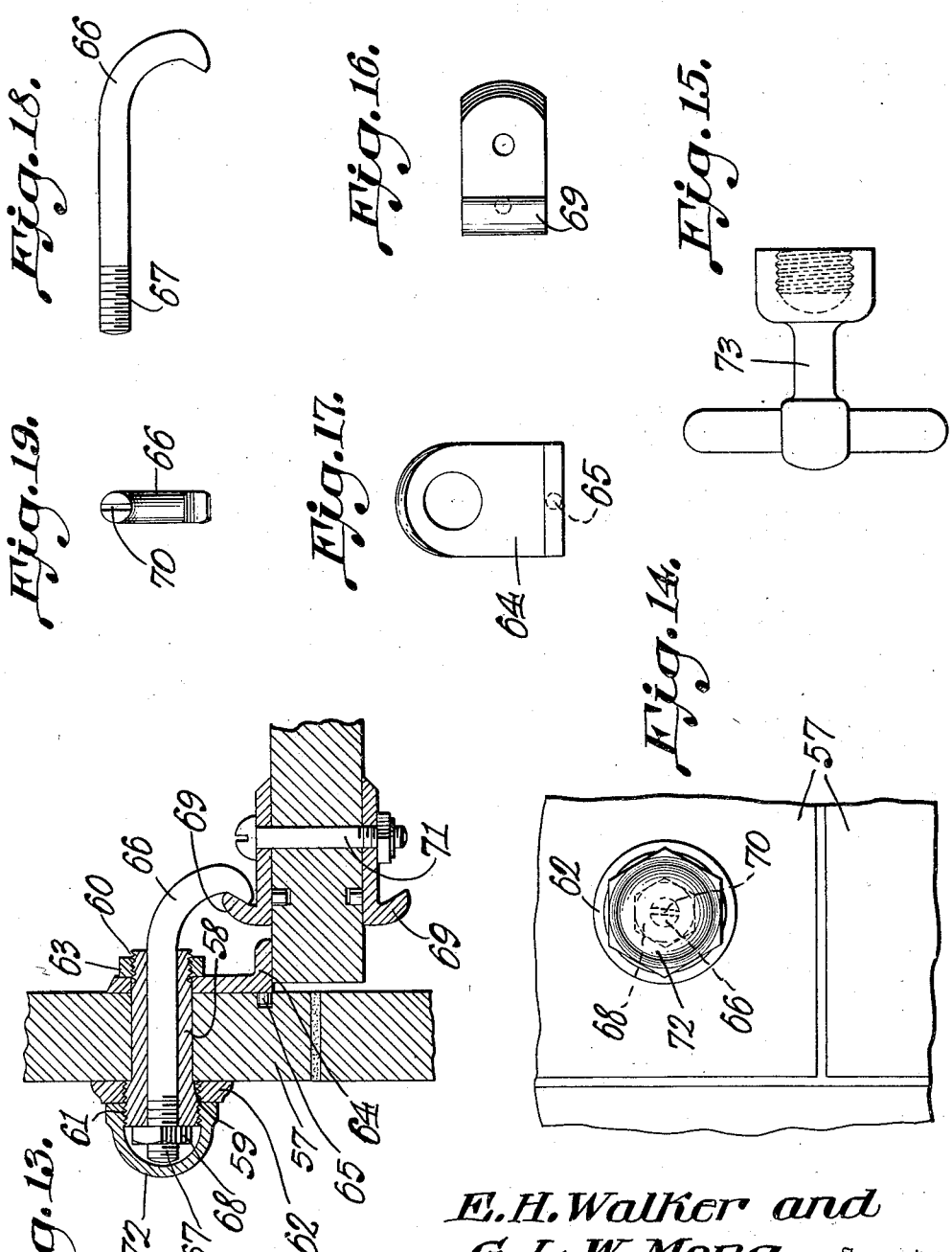

1,858,722

UNITED STATES PATENT OFFICE

EDWARD H. WALKER AND GEORGE L. W. MONG, OF SOMERSET, PENNSYLVANIA

MAUSOLEUM

Application filed November 29, 1929. Serial No. 410,570.

This invention relates to mausoleum construction, the primary object of the invention being to provide a device of this character, the walls thereof being constructed to permit of free circulation of air through the walls and partitions of the building to insure perfect ventilation.

Another object of the invention is to provide filtering and purifying means in the walls of the building to filter liquids that may pass from the crypts, forming a part of the mausoleum.

A still further object is the provision of removable crypt closures, novel means being provided for securing the closures in their active positions.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a transverse sectional view through a mausoleum constructed in accordance with the invention, the same being taken on line 1—1 of Figure 2.

Figure 2 is a sectional view taken on line 2—2 of Figure 1.

Figure 3 is a sectional view taken on line 3—3 of Figure 1.

Figure 4 is a sectional view taken on line 4—4 of Figure 1.

Figure 5 is a sectional view taken on line 5—5 of Figure 2.

Figure 6 is an elevational view of the tower, forming a part of the ventilating system.

Figure 7 is a fragmental perspective view illustrating the manner of constructing the walls of the mausoleum to insure ventilation.

Figure 8 is a sectional view taken on line 8—8 of Figure 5.

Figure 9 is a fragmental sectional view illustrating the manner of constructing the crypt walls.

Figure 10 is a fragmental sectional view illustrating a modified form of crypt wall.

Figure 11 is a fragmental sectional view illustrating another modified form of crypt wall.

Figure 12 illustrates a still further form of crypt wall.

Figure 13 is a fragmental sectional view through the front end of a crypt, illustrating the manner of securing the removable closures.

Figure 14 is a fragmental elevational view of a crypt after the closure has been positioned.

Figure 15 is an elevational view illustrating one of the removable lifting handles used in lifting a closure.

Figure 16 is a plan view of one of the sections of the crypt closure securing device.

Figure 17 is a plan view of the cooperating sections of the crypt closure securing device.

Figure 18 is an elevational view of one of the hooks, forming a part of the closure securing device.

Figure 19 is an end elevational view thereof.

Referring to the drawings in detail, the mausoleum, forming the essence of this invention, is preferably rectangular in formation, the outer walls thereof being moisture proof, the same embodying outer concrete slabs 5, layers of concrete blocks 6, and an inner wall of hollow tile indicated at 7. A suitable damp proof material indicated at 8 is positioned between the concrete slabs 5 and concrete blocks 6. A layer of waterproofing material indicated at 9 is also positioned between the adjacent surfaces of the concrete blocks 6 and wall of hollow tile 7, thereby insuring against moisture entering the interior of the crypt.

In order to reinforce the wall, the concrete blocks are filled with concrete material in which the reinforcing rods 10 are embedded. Concrete material is also poured into the hollow tile wall construction, in which the reinforcing rods 11 are embedded.

The roof of the building includes a layer of reinforced hollow tile, which tiles are laid end to end providing a continuous air passageway from the front and rear ends of the building to a point adjacent to the center of the building, where they communicate with a central air chamber 13. A layer of concrete is now positioned over the layer of hollow tile, the concrete being indicated at 14 and as shown, a wire mesh material indicated at 15 is embedded in the layer of concrete, reinforcing it.

Embedded in the concrete material is a layer of waterproofing material 15', over which puddlers clay indicated at 16', is positioned to absolutely insure a water tight roof construction. The ceiling 17' is supported in spaced relation with the layer of hollow tiles 12 providing a passageway 18', which also communicates with the central passageway or ventilating tower. It might be further stated that the passageways formed by the layer of hollow tile 12, communicate with certain passageways formed by the partitions of the crypts, forming a part of the mausoleum, and to be hereinafter more fully described.

The floor of the mausoleum includes a concrete layer 16 resting on the corner blocks 17 and 18 respectively, over which layer of concrete is positioned suitable waterproofing material. A layer of concrete indicated at 19 is placed over the waterproofed surface of the concrete layer 16, whereupon a waterproofing material indicated at 20 is positioned on the concrete layer 19. Above the waterproofing layer 20, is the floor proper indicated at 21 which may be constructed of tile or other suitable material, and as shown this flooring 21 is supported on the subfloor 22 which is constructed of hollow tiles so arranged that passageways are provided the passageways being indicated by the reference characters 23 and 24 respectively, which passageways communicate with the ventilators 26 and 27 arranged adjacent to the front of the building. Each of these ventilators comprises a body portion 28 having an entrance opening 29 at the front thereof, the entrance opening being covered by a wire mesh material 30 to filter the air passing into the ventilators. Movable louvers 31 are also provided in the openings 29 and are designed to regulate the passage of air into the ventilators.

A vertical partition 32 extends into each ventilator body, the upper end of the partition being spaced from the top of the body portion to permit air to pass upwardly and downwardly, as indicated by the arrows in Figure 3 of the drawings.

A removable filtering member 33 is secured within the body portion of each ventilator, adjacent to the lower end thereof, the filtering members of the ventilators being constructed of fabric material and irregularly formed to insure a complete filtering of the air passing through the ventilator. As shown, the air on passing through the members 33 passes into the passageways 23 and 24. The ventilating tower, which is located substantially centrally of the building, and which is indicated by the reference character 34, communicates with the air chamber 13 at the base of the tower. At the base of the tower, is a curved supporting member 35 formed of wire mesh material curved to support the weight of the filtering material indicated at 36, and which is preferably a quantity of charcoal, to the end that the air passing into the tower 34 will be freed of any foul odors. To increase the draft through the tower 34, louvers 37 are provided in the outlet openings of the tower, which are disposed adjacent to the upper end thereof. A blower not shown may be positioned in the tower to force air therethrough. The interior of the mausoleum is constructed to provide a corridor or chapel indicated generally by the reference character 38, the corridor communicating with the entrance corridor 39. The crypts are arranged in tiers on opposite sides of the chapel or corridor 38, the crypts being indicated by the reference character 40.

The crypts are formed with walls 41 and 42, the walls 41 being constructed of bricks positioned at right angles to each other and spaced apart to provide vertical passageways 43, the bricks and the manner of laying the bricks being clearly set forth by Figure 7 of the drawings.

In the formation of these walls, certain of the bricks which are indicated by the reference character 44, are wider than the remaining bricks, providing shoulders on which the slabs 45 rest, the slabs constituting the floors or bottoms of the crypts. As clearly shown by the drawings, bricks are omitted in the constructions of the side walls of the crypts, which provide openings 46 establishing communication between the crypts and vertical passageways 43, so that liquids which may collect in the crypts, may drain therefrom and pass into the passageways 43. At the base of each passageway 43, is arranged a quantity of material embodying a mixture of dry sand and charcoal through which the liquid must pass, with the result that the liquid is purified.

The hollow tiles constituting the floor of the mausoleum, are partially filled with a mixture of sand and charcoal, to further filter the liquids that may find their way into the passageways and spaces under the floor.

The spaces between the tiers of crypts, are closed by gates 47 and may be used by persons in paying respect to the dead resting in the caskets placed in the crypts. In the form of the invention as shown by Figure 9, the floor slab 48 of this type of crypt, has its forward end positioned in recesses 49 formed in the adjacent ends of the slabs 50 of the rear wall of the crypt.

In the form of the invention as shown by Figure 10, the bottoms of the crypts or crypt shelves, which are indicated by the reference character 51, are provided with reduced end portions 52 fitted within layers of bricks of the wall construction of the crypts.

As shown by Figure 11, the bottom slabs, which are indicated by the reference character 53, have their ends resting between concrete slabs 54 that constitute the partitions or sides of the crypts.

In Fig. 12 a further modified form of the crypt wall construction is shown, and in this construction bricks such as indicated at 55, are provided, which bricks are larger than the remaining bricks of the wall, to provide shoulders to accommodate the slabs 56 forming the shelves or bottoms of the crypts. The closures for the crypts are shown more particularly by Figures 13 and 14 of the drawings, the closures which are indicated by the reference character 57, being supplied with openings to receive the tubular members 58, which are disposed adjacent to the upper ends of the closures. These members 58 are provided with shoulders 59 and threaded extremities 60 and 61 respectively, the threaded extremity 61 being provided to receive the nut 62, while the threaded extremity 60 receives the nut 63 to hold the member 58 on which the nuts are positioned, in position.

Removable bracket members 64 are provided and have openings to receive the members 58, the bracket members being provided with inwardly disposed lugs 65 that seat in openings formed in the closures 57 to prevent movement of the bracket members. These bracket members rest under the floor slab of the crypts, with which the closures are used.

Hook members 66 extend through the members 58 and have threaded extremities 67 that receive nuts 68. The hook members 66 cooperate with the keepers 69 that are removably secured to the upper and lower surfaces of the slab forming the bottom or horizontal partitioning member between upper and lower crypts, so that as the nuts 68 are rotated, the hook members will be tightened, drawing the closure to its proper closing position. In order that the hook members may be rotated to bring them to their proper securing positions with respect to the keepers 69, a slot 70 is formed in the outer end of each hook member, the slots to be engaged by tools such as screw drivers.

The keepers 69 are secured to the upper and lower surfaces of the slab associated therewith, by means of bolts such as shown at 71. It might be further stated that finishing caps 72 are provided and positioned over the outer ends of the threaded extremities of the members 58. These finishing caps may be removed and handles such as indicated at 73 are provided, which handles may be positioned over the threaded extremities 61 in lieu of the caps, to the end that the closures, which are exceptionally heavy, and formed preferably of slabs of marble, may be readily and easily positioned without danger of the same breaking.

The front of the mausoleum may be constructed in any desired manner, and provided with suitable doors to permit the building to be locked against unauthorized persons entering the building.

From the foregoing it will be seen that due to the construction shown and described, the interior walls of the building will be ventilated at all times, thereby eliminating sweating and at the same time providing passageways to carry off obnoxious odors.

It might be further stated that electric heaters such as indicated at 74 are provided to heat the interior of the building, under certain conditions.

We claim:

1. A mausoleum construction comprising a building having side and end walls, a floor and roof forming a part of the building, ventilators having openings open to the atmosphere and having partitioning walls to cause air to pass upwardly and downwardly through the ventilators, passageways in the floor, passageways in the side walls, said passageways being in communication, an air chamber into which air passes from the passageways, and a central tower communicating with the air chamber and having openings, and said tower providing an exhaust for air passing through the passageways.

2. A mausoleum construction comprising a building having side and end walls, each wall comprising an outer slab, a layer of concrete blocks disposed adjacent to the slab, a waterproofing material between the slab and concrete blocks, a layer of hollow tile blocks arranged adjacent to the layer of concrete blocks, a waterproofing material between the concrete blocks and hollow tile blocks, a layer of bricks adjacent to the hollow tile blocks and arranged end to end to provide rectangular passageways throughout the length of the wall, and waterproofing material between the hollow tile blocks and layer of bricks.

3. A mausoleum construction including side and end walls, crypts including floor slabs, keepers carried by the floor slabs, closure slabs, hook members supported within the closure slabs and adapted to engage the keepers to secure the closure slabs in position, and means for exerting a pull on the hook members to draw the closure slabs in position.

4. A mausoleum construction comprising a building having side and end walls, a floor and a roof forming a part of the building, passageways extending under the floor of the building, said side and end walls being hollow, providing vertical passageways communicating with the first mentioned passageways, a subfloor constructed of hollow blocks providing passageways, crypts within the building, said crypts having openings to permit liquid to drain into the passageways, and filtering material in the passageways of the subfloor.

In testimony that we claim the foregoing as our own, we have hereto affixed our signatures.

EDWARD H. WALKER.
GEORGE L. W. MONG.